UNITED STATES PATENT OFFICE.

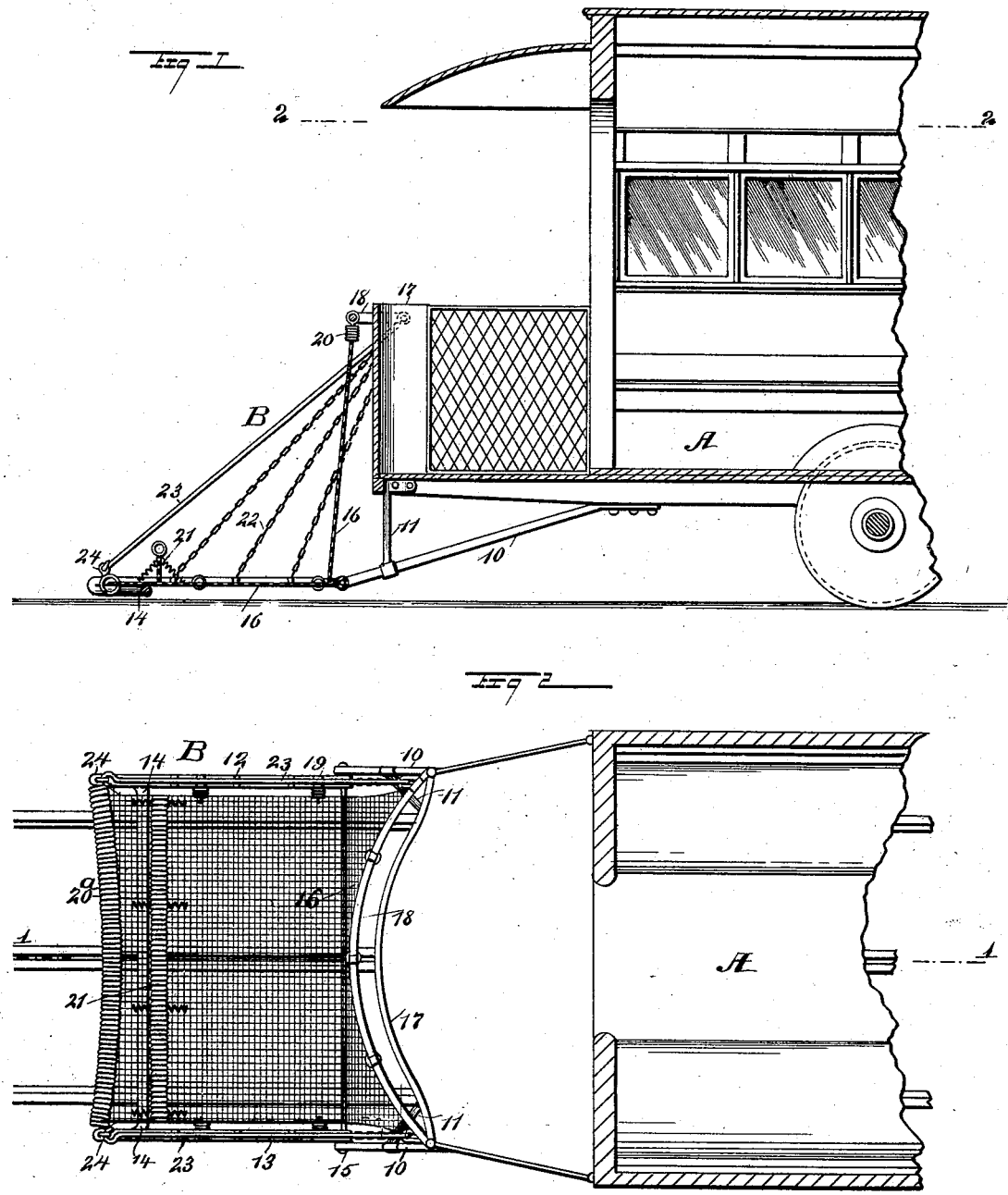

HENRY S. ROBINS, OF PHILADELPHIA, PENNSYLVANIA.

SAFETY-FENDER FOR TRAM-CARS.

SPECIFICATION forming part of Letters Patent No. 507,167, dated October 24, 1893.

Application filed November 21, 1892. Serial No. 452,625. (No model.)

*To all whom it may concern:*

Be it known that I, HENRY S. ROBINS, of Philadelphia, in the county of Philadelphia and State of Pennsylvania, have invented a new and useful Improvement in Safety-Fenders for Tram-Cars, of which the following is a full, clear, and exact description.

My invention relates to an improvement in safety fenders for tram cars, and especially to an improvement in fenders for cars propelled by cable or electric power, and the object of the invention is to provide a fender of exceedingly simple and durable construction and capable of application to the front or to the rear of any car, which fender when in use will receive and sustain without injury any person that may stand in the path of the car, and further to construct the fender in such manner that when the car is not in use the fender may be folded up so as to occupy but little space.

The invention consists in the novel construction and combination of the several parts, as will be hereinafter fully set forth and pointed out in the claims.

Reference is to be had to the accompanying drawings forming a part of this specification, in which similar figures and letters of reference indicate corresponding parts in all the views.

Figure 1 is a vertical section taken through the fender and a portion of a car to which the fender is attached; and Fig. 2 is a horizontal section taken practically on the line 2—2 of Fig. 1.

In carrying out the invention two arms 10, are projected preferably from the under portion of the car A, the arms extending downwardly and outwardly beyond the outer edge of the front platform. These arms may partake of any approved shape, and ordinarily they are braced by brackets 11, connected with them and with the platform.

The fender B, consists of a frame, which frame comprises ordinarily two side bars 12 and 13 and a front cross bar 14, which connects the side bars at some little distance from their forward ends, and if in practice it is found desirable, and as shown in the drawings, the front cross bar 14, may be a continuation of the side bars. The side bars 12 and 13, at their inner ends, are pivotally attached to the arms 10, the pivot point or rod 15, being usually made to extend from one arm 10 to the other.

The body of the fender comprises a strip or strips of wire netting 16, or the equivalent thereof, which netting extends from side bar to side bar of the frame, and the forward end of the netting is practically flush with the forward extremities of the frame, while the netting is carried upward from the pivoted point of the frame to an attachment with the dashboard 17 of the car, the attachment being usually made to a rail 18, secured to the dashboard in any suitable or approved manner, and extending upwardly therefrom. If in practice it is found desirable the upper section of the woven wire body of the fender may constitute an integral portion of the lower or horizontal section, or it may be attached thereto in any suitable or approved manner.

The lower section of the woven wire body of the fender is connected with the side bars of the frame through the medium of springs 19; and the upper edge of the upper section is attached to the rail 18 in like manner; that is, by series of springs 20.

The forward or outer edge of the fender consists of a closely coiled spring $20^a$, which may constitute an integral portion of the fender, or may be attached thereto; and transversely across the lower or horizontal portion of the fender a partition 21, is located, as shown in Fig. 2, adapted to prevent any person that may fall upon the lower portion of the fender from rolling off from it. The partition as preferably made, consists of a woven wire body provided with supporting springs at its sides and a head made of coiled wire extending from end to end of the body.

The frame section of the fender is held in a horizontal position, as close to the track upon which the car travels as practical; this result is preferably attained by means of a series of chains 22, which chains are attached at intervals to the side bars of the frame, and the chains at each side are attached to the under portions of the rail 18; but while the chains serve as one means of support for the lower section of the fender, a second and more rigid support is provided in the shape of two rods 23, located one at each side, which rods are pivoted at their upper ends either to the dashboard of the car, or to the rail 18, and the rods at their lower ends are provided with hooks adapted to enter eyes 24, formed upon the side pieces of the frame. These rods 23, serve to brace and strengthen the fender and prevent it from having lateral movement, and when the fender is to be folded upward, for example when the car is carried into a shed, the rods 23, are disengaged from the eyes 24, and the lower portion of the fender is folded upward parallel and in engagement with its upper section, and is secured to the rail 18 in any approved manner.

In operation, when a car is traveling along a track and a person is caught by the car in its path, the spring 20ª at the forward end of the fender will strike the person below the center of gravity, and the person will fall upon the receiving or lower section of the fender, and should the person strike the upright section of the fender he will be prevented from rolling or falling from the fender by reason of the transverse spring partition 21, and as the front portion of the fender is yielding the person struck by the fender will not suffer any material damage by the contact.

It is obvious that this device is exceedingly simple, durable and economic, and that it may be applied to any car with but little expense or trouble; it is automatic in its action, and further it may be folded up out of the way, or may be placed in position for use both expeditiously and conveniently.

Having thus described my invention, I claim as new and desire to secure by Letters Patent—

1. A fender for cars, comprising a frame, a body portion carried by the frame, and a transverse partition, substantially as described.

2. A fender for cars, comprising a frame, a pliable body portion carried by the frame, and a transverse yielding partition, substantially as described.

3. A safety fender for tram cars, the same consisting of a frame adapted for attachment to a car, a body of a yielding material having a spring connection with the frame, a cushion located at the forward portion of the body, and a yielding partition located upon the body, as and for the purpose set forth.

4. A safety fender for tram cars, the same consisting of a frame adapted for pivotal connection with the car, a yielding body portion having a spring connection with the frame, the forward portion of the body extending beyond the front edge of the frame, and the said front edge of the body being provided with a cushion, and a partition extending across the body, the partition being of a yielding character, as and for the purpose set forth.

5. The combination, with a car, of arms projected from the under portion thereof beyond its ends, and a frame having pivotal connection with the arms, a body of a yielding material having a spring connection with the frame and extending upward to a connection with the car, forming an upper and a lower section, one section capable of folding upon the other, yielding supports connecting the car and the frame, and a tie-bar also connecting the car and the frame, substantially as shown and described.

6. The combination, with a car, of arms projected from the under portion thereof beyond its ends, and a frame having pivotal connection with the arms, a body of a yielding material having a spring connection with the frame and extending upward to a connection with the car, forming an upper and a lower section, one section capable of folding upon the other, yielding supports connecting the car and the frame, a tie-bar also connecting the car and the frame, a spring cushion located at the forward end of the body and extending beyond the front edge of the frame, and a yielding partition carried by the lower section of the body, as and for the purpose set forth.

HENRY S. ROBINS.

Witnesses:
Thos. S. Stout,
Leonard Pinteche.